United States Patent
Oe et al.

(10) Patent No.: US 9,218,276 B2
(45) Date of Patent: Dec. 22, 2015

(54) STORAGE POOL-TYPE STORAGE SYSTEM, METHOD, AND COMPUTER-READABLE STORAGE MEDIUM FOR PEAK LOAD STORAGE MANAGEMENT

(71) Applicant: FUJITSU LIMITED, Kawasaki-shi (JP)

(72) Inventors: Kazuichi Oe, Yokohama (JP); Kazutaka Ogihara, Hachioji (JP); Yasuo Noguchi, Kawasaki (JP); Tatsuo Kumano, Kawasaki (JP); Masahisa Tamura, Kawasaki (JP); Munenori Maeda, Yokohama (JP); Ken Iizawa, Yokohama (JP); Toshihiro Ozawa, Yokohama (JP); Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 268 days.

(21) Appl. No.: 13/707,667

(22) Filed: Dec. 7, 2012

(65) Prior Publication Data
US 2013/0219144 A1 Aug. 22, 2013

(30) Foreign Application Priority Data
Feb. 17, 2012 (JP) .................................. 2012-032838

(51) Int. Cl.
*G06F 12/00* (2006.01)
*G06F 13/00* (2006.01)
(Continued)

(52) U.S. Cl.
CPC ................ *G06F 12/02* (2013.01); *G06F 3/067* (2013.01); *G06F 3/0608* (2013.01); *G06F 3/0611* (2013.01); *G06F 3/0647* (2013.01); *G06F 3/0649* (2013.01); *G06F 3/0653* (2013.01); *G06F 3/0685* (2013.01)

(58) Field of Classification Search
CPC ....... G06F 12/02; G06F 3/0685; G06F 3/067; G06F 3/0647; G06F 3/0608; G06F 3/0611; G06F 3/0653; G06F 3/0649

USPC .................................................. 711/165, 167
See application file for complete search history.

(56) References Cited

U.S. PATENT DOCUMENTS 7,904,744 B2 3/2011 Oikawa et al.
8,312,312 B2 11/2012 Oikawa et al.
(Continued)

FOREIGN PATENT DOCUMENTS

JP 2001-67187 A 3/2001
JP 2008-242872 10/2008
(Continued)

OTHER PUBLICATIONS

Japanese Office Action mailed on Sep. 1, 2015 for corresponding Japanese Patent Application No. 2012-032838, with Partial English Translation, 6 pages.

*Primary Examiner* — Sanjiv Shah
*Assistant Examiner* — Shane Woolwine
(74) *Attorney, Agent, or Firm* — Fujitsu Patent Center

(57) ABSTRACT

A storage apparatus is provided, including a first storage unit; a load information obtaining unit that obtains load information for each of a plurality of portions defined by dividing the first storage unit; a portion identifying unit that identifies a candidate portion that is to be relocated in the first storage unit based on the load information; a determining unit that determines whether or not data in the candidate portion is allowed to be migrated to a second storage unit, the second storage unit having a performance value higher than a performance value of the first storage unit; an adder that adds the second storage unit, when the determining unit determines that the data in the candidate portion is not allowed to be migrated; and a relocation unit that migrates the data in the candidate portion from the first storage unit to the added second storage unit.

15 Claims, 12 Drawing Sheets

(51) Int. Cl.
*G06F 13/28* (2006.01)
*G06F 12/02* (2006.01)
*G06F 3/06* (2006.01)

(56) References Cited

U.S. PATENT DOCUMENTS

| | | | |
|---|---|---|---|
| 2003/0046491 A1* | 3/2003 | Katsurashima | 711/114 |
| 2010/0250831 A1* | 9/2010 | O'Brien et al. | 711/103 |
| 2010/0281230 A1* | 11/2010 | Rabii et al. | 711/165 |
| 2010/0332746 A1* | 12/2010 | Kassai | 711/113 |
| 2011/0138136 A1* | 6/2011 | Shitomi et al. | 711/154 |
| 2013/0151683 A1* | 6/2013 | Jain et al. | 709/223 |

FOREIGN PATENT DOCUMENTS

| | | |
|---|---|---|
| JP | 2009-289161 A | 12/2009 |
| JP | 2011-86077 A | 4/2011 |
| JP | 2011-242862 A | 12/2011 |

* cited by examiner

FIG. 7

```
Time: 12:08:27
avg-cpu:  %user   %nice  %system  %iowait  %steal   %idle
           0.01    0.00     0.11    62.45    0.00   37.44

Device:    rrqm/s   wrqm/s     r/s     w/s   rsec/s   wsec/s  avgrq-sz  avgqu-sz   await   svctm   %util
sdb          0.00     0.00    0.00    0.00     0.00     0.00      0.00      0.00    0.00    0.00    0.00
sdc        374.55   294.60  108.20  139.40  2095.60  2093.20     16.92      9.99   40.37    4.04  100.01
                                      ↑                                                              ↑
                                For HDD31 only                                                  Overloaded
                                247.60 iops
```

HDD31 ― SSD33

FIG. 8

```
ReadIostatLog: filename = .iostat/log0/IOSTAT_LOG
MoveSsdCore: keys= [20110906121441, 20110906121341, 20110906121240, 201109061
21140] 8
i ----> 99.05 4.0725 243.36 0.40701090664
i2 ----> 0.0 0.0 0.0 0
device busy!, HDD %util = 99.05
Step1-0: 93-1
Step1-0: 137-1
Step1-0: 90-1
Step1-0: 124-1
Step1-0: 70-1
Step1-0: 128-1
Step1-0: 108-1
Step1-0: 69-1
Step1-0: 126-1
Step1-0: 129-1
Step1-0: 74-1
Step1-0: 133-1
Step1-1: 133 39.8869986851 13
Step1-2: 5415 98 ['93', '137', '92', '90', '124', '70', '128', '108', '69',
'126', '129', '74', '133'] [195035136, 287309824, 192937984, 188743680, 260046
848, 146800640, 268435456, 226492416, 144703488, 264241152, 270532608, 1551892
48, 278921216]
Step1-3: [2097152, 4194304, 6291456, 8388608, 10485760, 12582912, 14680064, 1
6777216, 18874368, 20971520, 23068672, 25165824, 27262976]
set_ssd_entry: echo ssd_entry_set 02097152 195035136 > /proc/ameba_tiering 0
Step1-4: move from HDD to SSD 0 / 13 2097152 195035136
main: get trace ... 2011-09-06 12:15:42.148866
ReadBlktraceLog: filename = .blktrace/log0/BLKTRACE_RESULTS
ReadIostatLog: filename = .iostat/log0/IOSTAT_LOG
set_ssd_entry: echo ssd_entry_set 0 4194304 287309824 > /proc/ameba_tiering 0
Step1-4: move from HDD to SSD 1 / 13 4194304 287309824
set_ssd_entry: echo ssd_entry_set 0 6291456 192937984 > /proc/ameba_tiering 0
Step1-4: move from HDD to SSD 2 / 13 6291456 192937984
set_ssd_entry: echo ssd_entry_set 0 8388608 188743680 > /proc/ameba_tiering 0
Step1-4: move from HDD to SSD 3 / 13 8388608 188743680
set_ssd_entry: echo ssd_entry_set 0 10485760 260046848 > /proc/ameba_tiering 0
Step1-4: move from HDD to SSD 4 / 13 10485760 260046848
set_ssd_entry: echo ssd_entry_set 0 12582912 146800640 > /proc/ameba_tiering 0
Step1-4: move from DHH to SSD 5 / 13 12582912 146800640
```

- Four samples are accumulated
- Overload on HDD detected
- Overloaded HDD portions are extracted 1 GB × 13 portions
- HDD sector numbers are extracted
- Destination SSD sector numbers are extracted
- Relocation is instructed for each portion. Delays are "20-30 sec/portion"
- IO requests received during portion relocation are queued in pending queue, which are processed after relocation

FIG. 9

```
Time: 12:20:47
avg-cpu: %user  %nice %system %iowait %steal %idle
          0.23   0.00   0.25    50.77   0.00  48.75

Device:  rrqm/s  wrqm/s    r/s    w/s   rsec/s   wsec/s  avgrq-sz  avgqu-sz  await  svctm  %util
sdb      159.00  119.35   47.00  56.75  896.00   852.80    16.86      0.02    0.17   0.16   1.71
sdc      261.40  180.85   70.35  87.35 1432.80  1290.00    17.27      6.66   42.16   4.36  68.75
```

HDD31+SSD33
261.45iops

Desired %util range is 60 – 90
Decreased to desired value

FIG. 12

```
┌─────────────────────────────────────────────────────────────┐
│         Given conditions: initial Load: 60 iops,            │
│      with increase of 10 iops/min => 660 iops after 1h      │
└─────────────────────────────────────────────────────────────┘
url=http://korinbo.zetta.flab.fujitsu.co.jp:8001/
ssd_devices: sdc []
create LogPool.
MoveSsdStatusCore started.
ManageSsdEntries started. /proc/ameba_tier_table_stats
ManageWorkloadSpikeCore started.
MoveSsdCore started.
MoveSsdCore: keys= [] 8            (a)Load after obtaining four statistics
MoveSsdCore: keys= [] 8                :%util = 26.7, about 80.7 iops
main: get trace ... 2011-11-15 02:13:08.222523
ReadBlktraceLog: filename = .blktrace/log0/BLKTRACE_RESULTS
ReadIostatLog: filename = .iostat/log0/IOSTAT_LOG
MoveSsdCore: keys= [20111115021308] 8
main: get trace ... 2011-11-15 02:14:08.356671
ReadBlktrcaeLog: filename = .blktrcae/log0/BLKTRACE_RESULTS
ReadIostatLog: filename = .iostat/log0/IOSTAT_LOG
MoveSsdCore: keys = [20111115021408, 20111115021308] 8
main: get trace ... 2011-11-15 02:15:08.531683
ReadBlktrcaeLog: filename = .blktrcae/log0/BLKTRACE_RESULTS
ReadIostatLog: filename = .iostat/log0/IOSTAT_LOG
MoveSsdCore: keys = [20111115021508, 20111115021408, 20111115021308] 8
main: get trace ... 2011-11-15 02:16:08.742861
ReadBlktrcaeLog: filename = .blktrcae/log0/BLKTRACE_RESULTS
ReadIostatLog: filename = .iostat/log0/IOSTAT_LOG
MoveSsdCore: keys = [20111115021608, 20111115021508, 20111115021408, 20111115021308] 8
i ----> 26.685 3.3225 80.695 0.330689633806 36.78
i2 ----> 0.0 0.0 0.0 0.0
b3 ----> ['93','137','92','90','124','70','128','69','108','126','74','129','110','133',
'91','94','123','125','71','140','131','127','149','149','139','121','75','136','145',
'89','87','146','146','109','109','134','255','132','132','150','106','148','148','130'
,'135','138','84','172','147','183','114','116','182','225','225','117','173','173','173
','226','184','115','227','227','227','191','191','191','246','246','194','194','100','
100','143','174','79']
iooffset_sma_all iops ----> 9.49090909091   <---(b)Simple moving average= 9.5 iops
iooffset_ave_all iops ----> 79.5454545455          Almost matched
sdb %util, sdc %util ----> 26.685 0.0
                                              (c)Estimated iops 1h after spike
                                                  : 634 iops
future_iooffset_ave_iops ----> 634
future_iooffset_key ----> ['137','93','70','90','124','92','108','110','128','69','126',
'91','74','127','131','133','123','139','147','87','140','145','71','116','76','132','2
26','130','80','143','122','169','89','144','225','184','66','135','166','227','100','1
9','79','246','75','97','106','77','129','134','118','264','171','85','174','170','158'
,'228','156','120','167','193','229','186','172','213','95','190','163','243','189','88
','142','84','15','115','119','164','141','62','8','177','202','234','203','195','218']
delta_ios ----> {'ssd_delta': 0, 'hdd_delta': 30533, 'hdd_all': 4284, 'ssd_all': 0}
hdd_future_util, ssd_future_util ----> 213.48 0.0
device free, future HDD %util = 0                     (d)%util = 213.5
main: get trace ... 2011-11-15 02:17:08.962438
ReadBlktraceLog: filename = .blktrace/log0/BLKTRACE_RESULTS
ReadIostatLog: filename = .iostat/log0/IOSTAT_LOG
^C received, shutting down server 1           Relocation from HDD to SSD
[root@R16-S09-C01-1 src]#                     is terminated hereafter
```

STORAGE POOL-TYPE STORAGE SYSTEM, METHOD, AND COMPUTER-READABLE STORAGE MEDIUM FOR PEAK LOAD STORAGE MANAGEMENT

CROSS-REFERENCE TO RELATED APPLICATION

This application is based upon and claims the benefit of priority of the prior Japanese Patent Application No. 2012-032838, filed on Feb. 17, 2012, the entire contents of which are incorporated herein by reference.

FIELD

The present disclosure relates to a storage apparatus, a storage system, a method of managing a storage, and a computer-readable storage medium having a storage management program stored thereon.

BACKGROUND

In storage apparatus, the configurations of storage apparatuses are designed, particularly focusing on the performance, considering how the storage apparatuses are used by users. This process is referred to as capacity planning (refer to Japanese Laid-open Patent Publication No. 2008-242872, for example).

Specifically, possible causes of slowdowns of the storage apparatus due to sudden loads are analyzed, and the configurations of the storage apparatuses are defined considering mid- and/or long-term load deviations. For example, in a pre-deployment capacity planning for a storage apparatus, the performance and capacity of that storage apparatus are defined.

Even when capacity planning is carried out, however, the performance and/or capacity of a storage apparatus may be turned out to be insufficient after the operation is started. In such a case, capacity planning is carried out again, and system or customer engineers manually modify the configuration of the storage apparatus based on the capacity planning. The storage apparatus is stopped during the configuration modification, which incurs down time of the system.

Generally, input/output (IO) accesses to a storage apparatus tend to be intensive on particular portions of a volume. Such portions are referred to as hot spots. Some hot spots appear in certain portions, while others wander across the volume from day to day. Such a wandering-type hot spot reaches its peak load which is about ten times higher than the average load, and the peak often lasts for about three to five hours.

Further, in some operations, a load may suddenly soar on a particular portion in a storage apparatus (such a sudden upsurge is referred to as a spike).

In conventional storage apparatuses, in order to ensure performance margin for accommodating the peak load of a hot spot, a capacity or performance margin kept by providing spare disks and/or using higher-performance disks, whereby improving the performances of the storage apparatus as a whole.

Further, although such a margin improves the performances of the storage apparatus as a whole, it incurs an additional cost for spare disks or overdesigned performance disks. Further, an unexpectedly high load still may occur, which cannot be addressed swiftly.

The performance of the storage apparatus may deteriorate if a certain portion in a volume is overloaded.

SUMMARY

Hence, a storage apparatus is provided, including a first storage unit; a load information obtaining unit that obtains load information for each of a plurality of portions defined by dividing the first storage unit; a portion identifying unit that identifies a candidate portion that is to be relocated in the first storage unit based on the load information; a determining unit that determines whether or not data in the candidate portion is allowed to be migrated to a second storage unit, the second storage unit having a performance value higher than a performance value of the first storage unit; an adder that adds the second storage unit, when the determining unit determines that the data in the candidate portion is not allowed to be migrated; and a relocation unit that migrates the data in the candidate portion from the first storage unit to the added second storage unit.

Further, a storage system is provided, including a first storage unit; a second storage unit having a performance value higher than a performance value of the first storage unit; an information processing apparatus connected to the first storage unit; a load information obtaining unit that obtains load information for each of a plurality of portions defined by dividing the first storage unit; a portion identifying unit that identifies a candidate portion that is to be relocated in the first storage unit based on the load information; a determining unit that determines whether or not data in the candidate portion is allowed to be migrated to the second storage unit; an adder that adds the second storage unit, when the determining unit determines that the data in the candidate portion is not allowed to be migrated; and a relocation unit that migrates the data in the candidate portion from the first storage unit to the added second storage unit.

Further, a method of managing a storage is provided, the method including: obtaining load information for each of a plurality of portions defined by dividing the first storage unit; identifying a candidate portion that is to be relocated in the first storage unit based on the load information; determining whether or not data in the candidate portion is allowed to be migrated to the second storage unit; adding the second storage unit, when it is determined that the data in the candidate portion is not allowed to be migrated; and relocating the data in the candidate portion from the first storage unit to the added second storage unit.

Further, a computer-readable storage medium having a storage management program stored thereon is provided, when executed by a computer, the storage management program makes the computer: obtain load information for each of a plurality of portions defined by dividing the first storage unit; identify a candidate portion that is to be relocated in the first storage unit based on the load information; determine whether or not data in the candidate portion is allowed to be migrated to the second storage unit; add the second storage unit, when it is determined that the data in the candidate portion is not allowed to be migrated; and relocate the data in the candidate portion from the first storage unit to the added second storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 7 illustrates an example of an iostat log before a relocation of hot spots in the storage system as an example of an embodiment hot spot;

FIG. 8 illustrates an example of an iostat log during the relocation of the hot spots in the storage system as an example of an embodiment hot spot;

FIG. 9 illustrates an example of an iostat log after the relocation of the hot spots in the storage system as an example of an embodiment hot spot;

FIG. 12 illustrates an example of a result of after a relocation based on a load prediction in the storage system as an example of an embodiment hot spot.

DESCRIPTION OF EMBODIMENT(S)

Hereunder is a description of an embodiment in accordance with the disclosed technique with reference to the drawings.

(A) Configuration

Hereinafter, a configuration of a storage system 1 as an example of an embodiment will be described with reference to the drawings.

Figure 1:
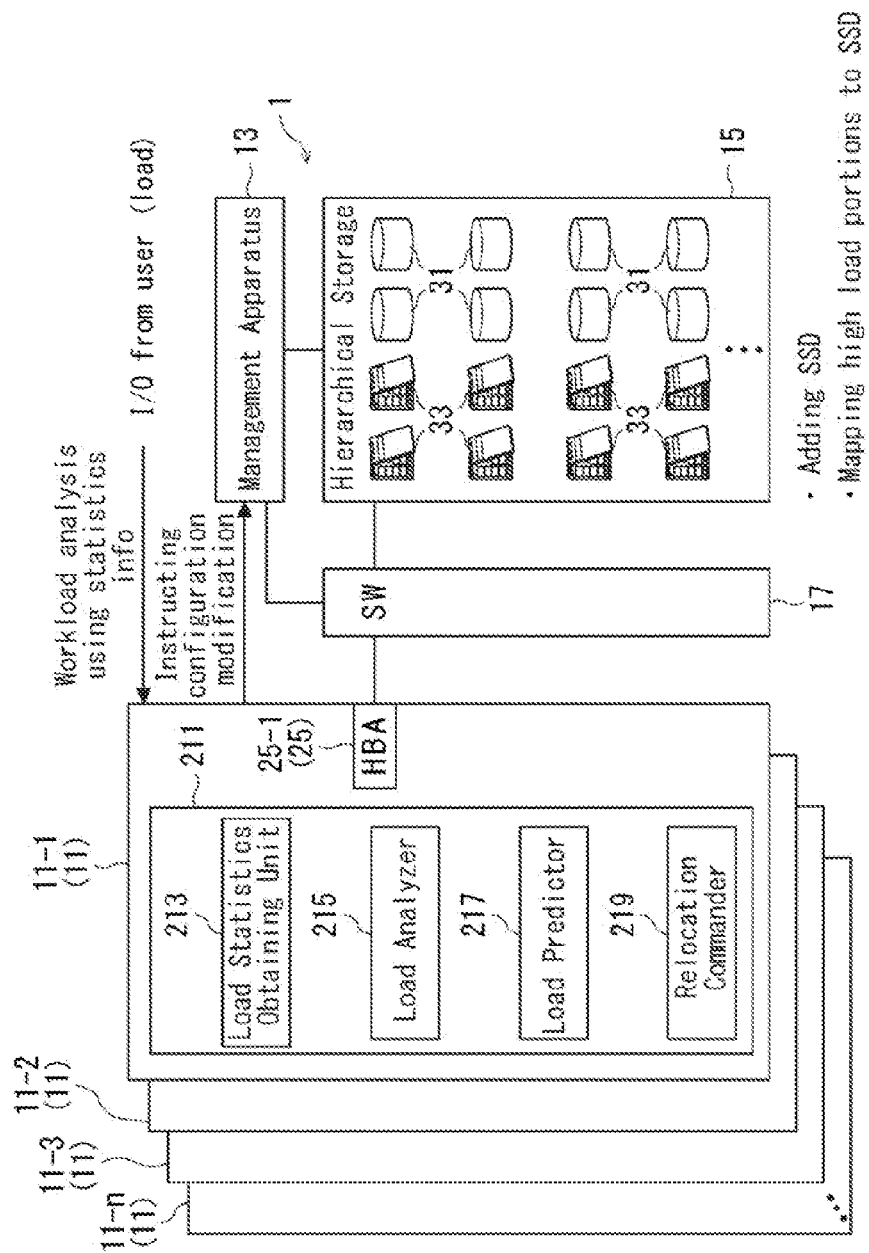
FIG. 1 is a schematic diagram illustrating a configuration of a storage system as an example of an embodiment.

FIG. 1 is a schematic diagram illustrating a configuration of a storage system 1 as an example of an embodiment.

In FIG. 1, the storage system (storage apparatus) 1 includes a CPU pool including n (n is a natural number of one or greater) information processing apparatuses 11-1, 11-2, ..., and 11-n, and a management apparatus (part of a relocation unit, determining unit, adder) 13, a disk storage pool 15, and a switch (SW) 17.

Note that the reference symbol 11-1, 11-2, ..., or 11-n is used hereinafter for referring to a specific information processing apparatus in the CPU pool while reference symbol 11 is used when reference is made to any of the multiple information processing apparatuses.

The CPU pool includes one or more information processing apparatuses 11 pooled therein. Each information processing apparatus 11 has portions in the disk storage pool allocated to that information processing apparatus 11, and reads and writes data from and to those portions, as a storage when operating.

In the illustrated example, all of the information processing apparatuses 11 in the CPU pool have similar configurations.

Note that the configuration of the information processing apparatuses 11 will be described with reference to FIG. 3.

The storage system 1 selects an appropriate storage device from the disk storage pool 15 in accordance with the load from users on an information processing apparatus 11, and connects that storage device to the information processing apparatus 11, for autonomously configuring the storage configuration that is suitable for handling the load from the user.

In other words, the storage system 1 is a configurable storage system wherein the storage configuration can be modified in accordance with a variation in the data volume and the load in the information processing apparatuses 11. That is, the storage system 1 can autonomously modify connections between the information processing apparatuses 11 in the CPU pool and the storage devices in the disk storage pool 15.

Figure 2:
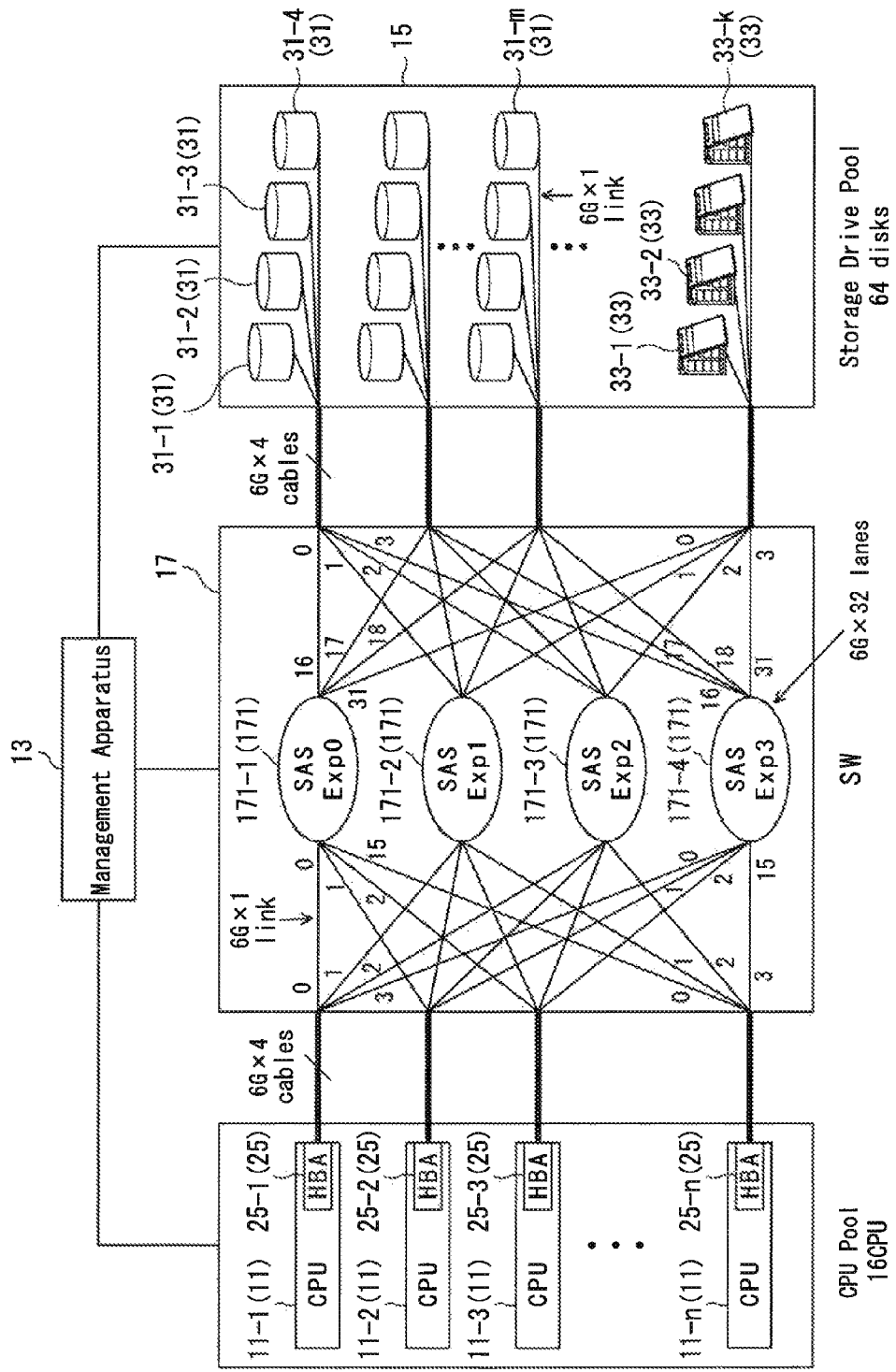
FIG. 2 is a schematic diagram illustrating a hardware configuration of the storage system as an example of an embodiment.

The disk storage pool 15 includes m (m is a natural number of one or greater) hard disk drives (HDDs) 31-1, 31-2, ..., and 31-m, and k (k is a natural number of one or greater) solid state drives (SSDs) 33-1, 33-2, ..., and 33-k, as depicted in FIG. 2, for example.

Note that the reference symbol 31-1, 31-2, ..., or 31-m is used hereinafter for referring to a specific HDD while reference symbol 31 is used when reference is made to any of the multiple HDDs.

Note that the reference symbol 33-1, 33-2, ..., or 33-k is used hereinafter for referring to a specific SSD while reference symbol 33 is used when reference is made to any of the multiple SSDs.

Each HDD 31 (first storage unit) is a storage drive including disks having magnetic materials applied thereon, as a recording medium, wherein, by moving a magnetic head, information is read and written from and to the disks rotating at a high speed.

Each SSD 33 (second storage unit) is a storage drive including a semiconductor memory as a recording medium, and is also referred to as a silicon disk drive or a semiconductor disk drive. Generally, the SSDs 33 enable faster random accesses than those of the HDDs 31, since the SSDs 33 do not require head seek time for moving the magnetic head, unlike the HDDs 31. The SSDs 33 are more expensive than the HDDs 31 since they have semiconductor memory devices.

As described above, since the disk storage pool (also referred to as a storage pool) 15 is a hierarchical (tiered) storage 15 having a hierarchical structure of the HDD 31 and the SSDs 33 enabling faster random accesses than those of the HDDs 31. In the storage system 1, the HDDs 31 and/or the SSDs 33 in the disk storage pool 15 are connected to or disconnected from the information processing apparatuses 11 by changing the settings of the switch 17.

That is, the capacity and the performance of storages for the information processing apparatuses 11 can be modified in the storage system 1, by connecting or disconnecting the HDDs 31 and/or SSD 33 to the information processing apparatuses 11.

As will be described later, the storage system 1 relocates (maps) data in hot spot portions in the HDDs 31 to one or more higher-performance SSDs 33 which are higher-performance storages, for example, thereby preventing the performances (e.g., the access speed and the response time) from deteriorating due to the IO loads.

Further, the storage system 1 predicts possible hot spot portions in the HDDs 31 which may expedience higher IO loads, and relocates these portions to the one or more SSDs 33, thereby further effectively preventing the performances from deteriorating due to the IO loads.

The information processing apparatuses 11 are connected to the switch 17 via the respective host bus adaptors (HBAs) 25-1 to 25-n, and the switch 17 is connected to the disk storage pool 15. The switch 17 switches connections between the information processing apparatuses 11 in the CPU pool and the HDDs 31 and the SSDs 33 in the disk storage pool 15, in response to modification to the settings in the switch 17.

Note that the reference symbol 25-1, . . . , or 25-n is used hereinafter for referring to a specific HBA while reference symbol 25 is used when reference is made to any of the multiple HBAs.

In the initial setting, each information processing apparatus 11 in the CPU pool is connected to a certain number of HDDs 31 and SSDs 33. When the free space in a HDD 31 connected to an information processing apparatus 11 is reduced, that information processing apparatus 11 requests the management apparatus 13 to add an HDD 31. In response to a request from the information processing apparatus 11 to add a HDD 31, the management apparatus 13 connects an additional HDD 31 to the requesting information processing apparatus 11.

Furthermore, each information processing apparatus 11 monitors the current IO load on that information processing apparatus 11. The information processing apparatus 11 then compares the current IO load of the one or more HDD 31 and/or SSD 33 connected to the information processing apparatus 11 and the maximum performance of the connected one or more HDD 31 and/or SSD 33. If the IO load is expected to reach the maximum performance, the information processing apparatus 11 requests the management apparatus 13 to add an SSD 33. In response to a request from the information processing apparatus 11 to add an SSD 33, the management apparatus 13 connects an additional SSD 33 to the requesting information processing apparatus 11.

Each information processing apparatus 11 predicts future load in that information processing apparatus. The information processing apparatus 11 then compares the predicted value and the maximum performance of the one or more HDD 31 and/or SSD 33 connected to the information processing apparatus 11. If the IO load is expected to reach a certain peak, the information processing apparatus 11 requests the management apparatus 13 to add an SSD 33. In response to a request from the information processing apparatus 11 to add an SSD 33, the management apparatus 13 connects an additional SSD 33 to the requesting information processing apparatus 11.

Hereinafter, one or more HDD 31 and/or SSD 33 connected to a certain information processing apparatus 11 may also be referred to as one or more HDD 31 and/or SSD 33 subordinate to that information processing apparatus 11.

The management apparatus 13 is an information processing apparatus that controls connections between the information processing apparatuses 11 in the CPU pool and the HDDs 31 and the SSDs 33 in the disk storage pool 15, and manages the HDDs 31 and the SSDs 33.

Hereinafter, the detailed configuration of the storage system 1 will be described.

The management apparatus 13, in response to a configuration modification request from one of the information processing apparatuses 11, connects that information processing apparatus 11 to a HDD 31 or an SSD 33 in the disk storage pool 15, or disconnects a subordinate HDD 31 or SSD 33.

The switch 17 includes multiple switches, e.g., SAS switches, for switching connections between information processing apparatuses 11 in the CPU pool and the storages (HDDs 31 and SSDs 33) in the disk pool. The switch 17 will be described in detail with reference to FIG. 2.

FIG. 2 is a schematic diagram illustrating a hardware configuration of the storage system 1 as an example of an embodiment.

FIG. 2 depicts a CPU pool including n (n is 16, in the illustrated example) information processing apparatuses 11 and a storage disk pool 15 including 64 disks, for example.

The switch 17 includes four serial attached SCSI (SAS) switches 171-1, 171-2, 171-3, and 171-4, for example.

Note that the reference symbol 171-1, 171-2, 171-3, or 171-4 is used hereinafter for referring to a specific SAS while reference symbol 171 is used when reference is made to any of the multiple SASs. In FIG. 2, the SAS switch 171-1 is denoted by Exp0. Similarly, the SAS switches 171-2, 171-3, and 171-4 are denoted by Exp1, Exp2, and Exp3, respectively.

The information processing apparatuses 11 are connected to each of the SAS switches 171 through SATA cables, for example, via their respective HBAs 25. For example, each of the SAS switches 171 is connected to each of the HDDs 31 and SSDs 33 in the disk storage pool 15 through a SAS cable supporting 6 giga bits per second (Gbps) (6G cable).

The management apparatus 13 switches the connections between each information processing apparatus 11 and the storage devices (HDDs 31 and SSDs 33) in the storage drive pool, by sending a command to the SAS switches 171 to switch the settings of the SAS switches 171.

Figure 3:
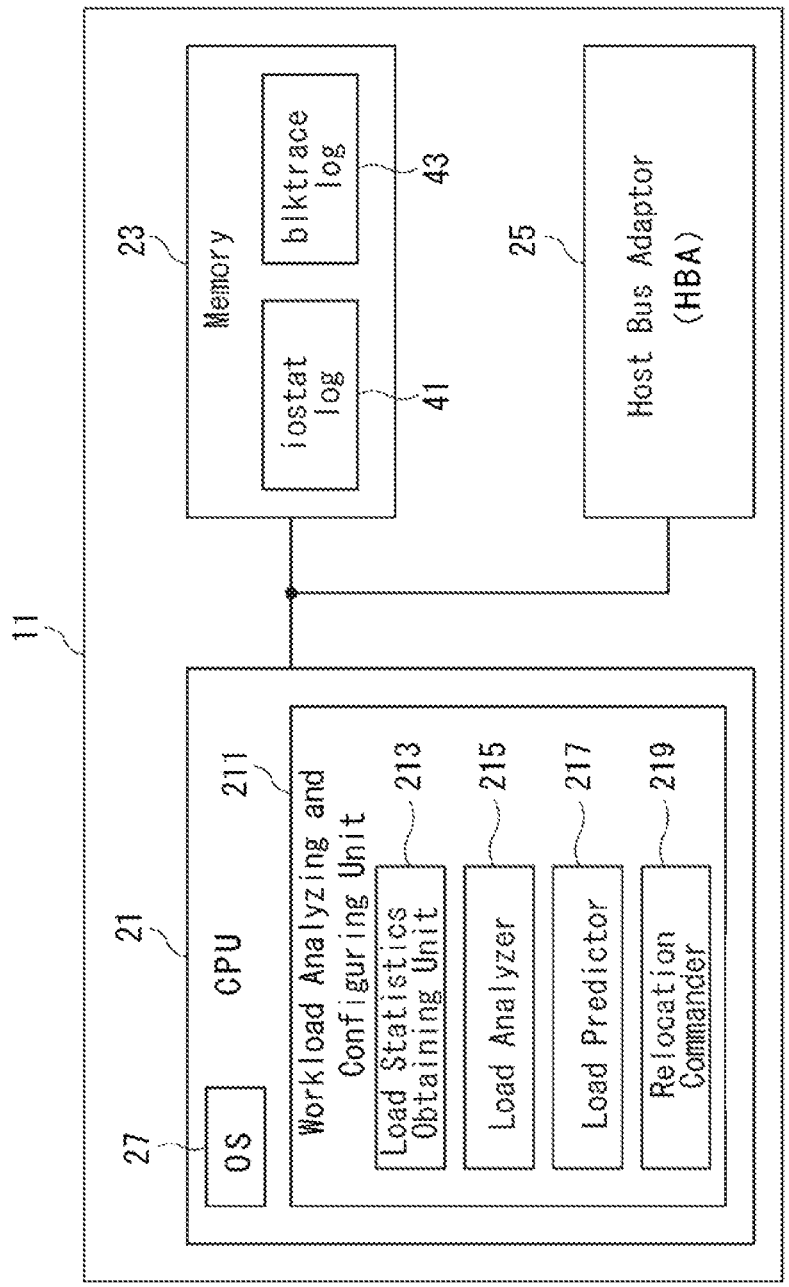
FIG. 3 is a diagram illustrating a configuration of an information processing apparatus in the storage system as an example of an embodiment.

FIG. 3 is a schematic diagram illustrating a configuration of an information processing apparatus 11 in the storage system 1 as an example of an embodiment.

As depicted in FIG. 3, the information processing apparatus 11 is a computer including a central processing unit (CPU) 21, a memory 23, and an HBA 25, for example.

The CPU 21 runs an operating system (OS) 27, which is system software for providing basic functions of the information processing apparatus 11. The CPU 21 executes various types of processing by running programs stored in the memory 23.

The memory 23 includes an information storing unit 208 that stores information to be processed in the information processing apparatus 11 where required. The memory 23 may be any of a wide variety of known memory devices, such as a random access memory, a read only memory (ROM), a non-volatile memory, and a volatile memory. Further, memory 23 may include multiple types of memory devices.

The HBA 25 is an adaptor that connects the information processing apparatus 11 to an external device, such as a storage device. The HBA 25 may be a SCSI adaptor, a fiber channel (FC) adaptor, a serial ATA adaptor, for example. Alternatively, the HBA 25 may be a device for connecting to a device compliant with standards, such as the IDE, Ethernet®, FireWire, and the USB.

The CPU 21 functions as a workload analyzing and configuring unit 211. The workload analyzing and configuring unit 211 analyzes the IO load (workload) from users on a storage subordinate to the information processing apparatus 11, and instructs the management apparatus 13 to modify the storage configuration based on the result of the load analysis. The workload analyzing and configuring unit 211 includes a load statistics obtaining unit (load information obtaining unit) 213, a load analyzer (portion identifying unit) 215, a load predictor (portion identifying unit) 217, and a relocation commander (part of a relocation unit, determining unit, adder) 219, as depicted in FIG. 1.

Further, the memory 23 stores load information for a storage subordinate to the information processing apparatus 11. For example, the memory 23 stores an iostat log 41 (load statistics value) recording OS statistics information, and a blktrace log 43 (load statistics value) recording IO trace information. As will be described later, the OS statistics information in the iostat log 41 contains iops (input/output per second) and the busy rate (util %) for the entire volume of each HDD 31. The IO trace information in the blktrace log 43 contains information, e.g., the IO count (iops), of each 1-GB segment which is a segment of 1 GB generated by dividing the volume of the HDD 31.

The load statistics obtaining unit 213 obtains statistics information about the load associated with an input/output (IO) from a user to at least one HDD 31 and/or SSD 33 connected to the information processing apparatus 11, and stores the information to the memory 23 as a blktrace log 43 and an iostat log 41.

For example, if the OS 27 on the information processing apparatus 11 is Linux®, the load statistics obtaining unit 213 collects OS statistics information using an iostat command to generate the iostat log 41.

The iostat command in Linux is used to obtain IO statistics information, and the option "-x" provides information, including the busy ratio for each disk (% util, % util of near 1000 indicates that the disk is approaching its performance limit).

% util indicates that ratio of the current performance of a disk to the peak performance.

The load statistics obtaining unit 213 executes the iostat command periodically (e.g., at one minute interval), and accumulates the resultant OS statistics information as an iostat log 41 sequentially.

The load statistics obtaining unit 213 accumulates all of iostat logs 41 obtained, in the memory 23. A desired record is obtained later from the accumulated iostat logs 41 by specifying date and time.

The load statistics obtaining unit 213 also collects IO traces to generate a blktrace log 43. For example, if the OS 27 on the information processing apparatus 11 is Linux, the load statistics obtaining unit 213 periodically executes a blktrace command and accumulates an IO trace in the memory 23 as a blktrace log 43.

The blktrace command in Linux is used to trace a block IO layer. The blktrace command traces the statuses of an IO request in the entry and exit of a block IO layer, and inside the block IO layer. The product of the trace is an IO trace.

The load statistics obtaining unit 213 executes the blktrace command periodically (e.g., at one minute interval), and accumulates an IO trace as the blktrace log 43.

In an example of an embodiment, the load statistics obtaining unit 213 saves the blktrace log 43 after processing it. For example, the load statistics obtaining unit 213 converts the blktrace log 43, for each 1-GB segment in the HDDs 31 and the SSDs 33 to: 1) the IO count, 2) the ratio per IO size, 3) the ratio of read/write, and 4) the response histogram and accumulates them. Here, the ratio per IO size indicates the ratio of each IO size (0.5, 1, 2, 4, . . . , and 512 kB) to the all IO instructions obtained using blktrace, and different IO instructions may have different IO sizes. Similarly, the ratio of read/write indicates the ratio of read instructions to write instructions obtained using blktrace.

In this manner, for example, for each of 1-GB segments in at least one HDD 31 and/or SSD 33 connected to the information processing apparatus 11, 60 blktrace logs 43 are accumulated in an hour.

The load analyzer 215 analyzes the workload (load) using multiple blktrace logs 43 and iostat logs 41 collected and accumulated by the load statistics obtaining unit 213. The detailed operations of the load analyzer 215 will be described with reference to FIG. 6.

The load predictor 217 analyzes a workload (load) in near future using multiple blktrace logs 43 and iostat logs 41 collected and accumulated by the load statistics obtaining unit 213. The detailed operations of the load predictor 219 will be described with reference to FIG. 9.

The relocation commander 219 requests relocations between storage portions in at least one HDD 31 and/or SSD 33 subordinate to the information processing apparatus 11, or requests addition or deletion of a HDD 31 or SSD 33 to or from the management apparatus 13 illustrated in FIGS. 1 and 2. As will be described later, the storage portions in at least one of HDD 31 and/or SSD 33 are managed and relocated in the unit of 1-GB segment, for example.

(B) Functions and Operations

Hereinafter, the functions and the operations of the storage system 1 as an example of an embodiment will be described with reference to the drawings.

Figure 4:
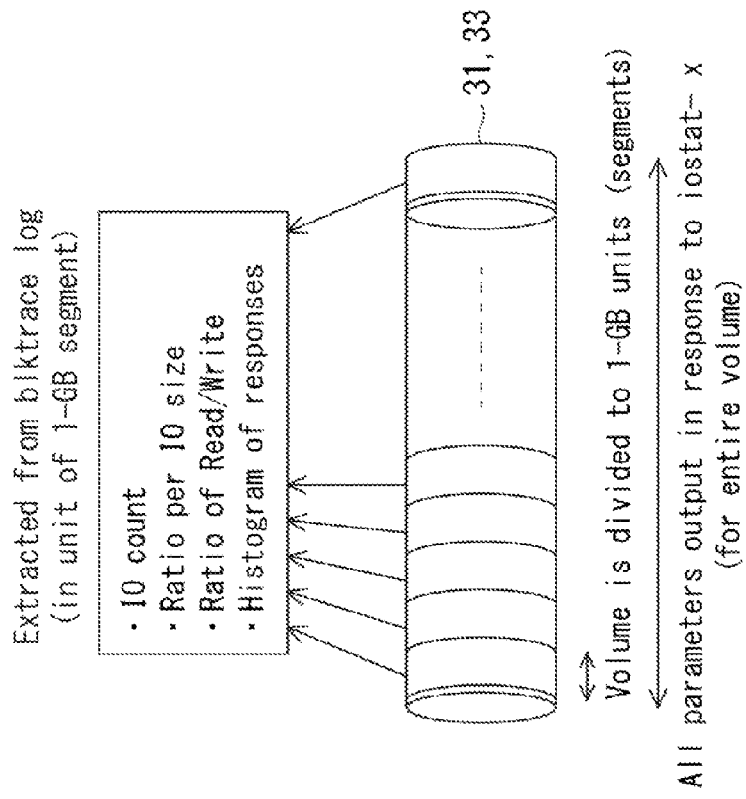
FIG. 4 is a diagram illustrating how the volume is divided in the storage system as an example of an embodiment.

FIG. 4 is a diagram illustrating how the volume is divided in the storage system 1 as an example of an embodiment.

As depicted in FIG. 4, storage portions in the HDDs 31 and the SSDs 33 are managed in the unit of 1-GB segment, which is obtained by dividing the HDDs 31 and the SSDs 33 in the unit of 1-GB.

In the unit of such a segment, data in that segment is relocated between a HDD 31 and an SSD 33.

As set forth above, for example, the load statistics obtaining unit 213 extracts, for each unit of 1-GB segment: 1) the IO count, 2) the ratio per IO size, 3) the ratio of read/write, and 4) the response histogram.

For the iostat logs 41, the load statistics obtaining unit 213 maintains the results of iostat -x command for the entire volume, as set forth above.

Next, a method of relocating a hot spot portion from a HDD 31 to an SSD 33 will be described with reference to FIG. 5. As used herein, the expression "relocating (or, migrating data in) a hot spot in a source" refers to copying data in that hot spot to a destination, and then deleting the data in the hot spot in the source.

Figure 5:
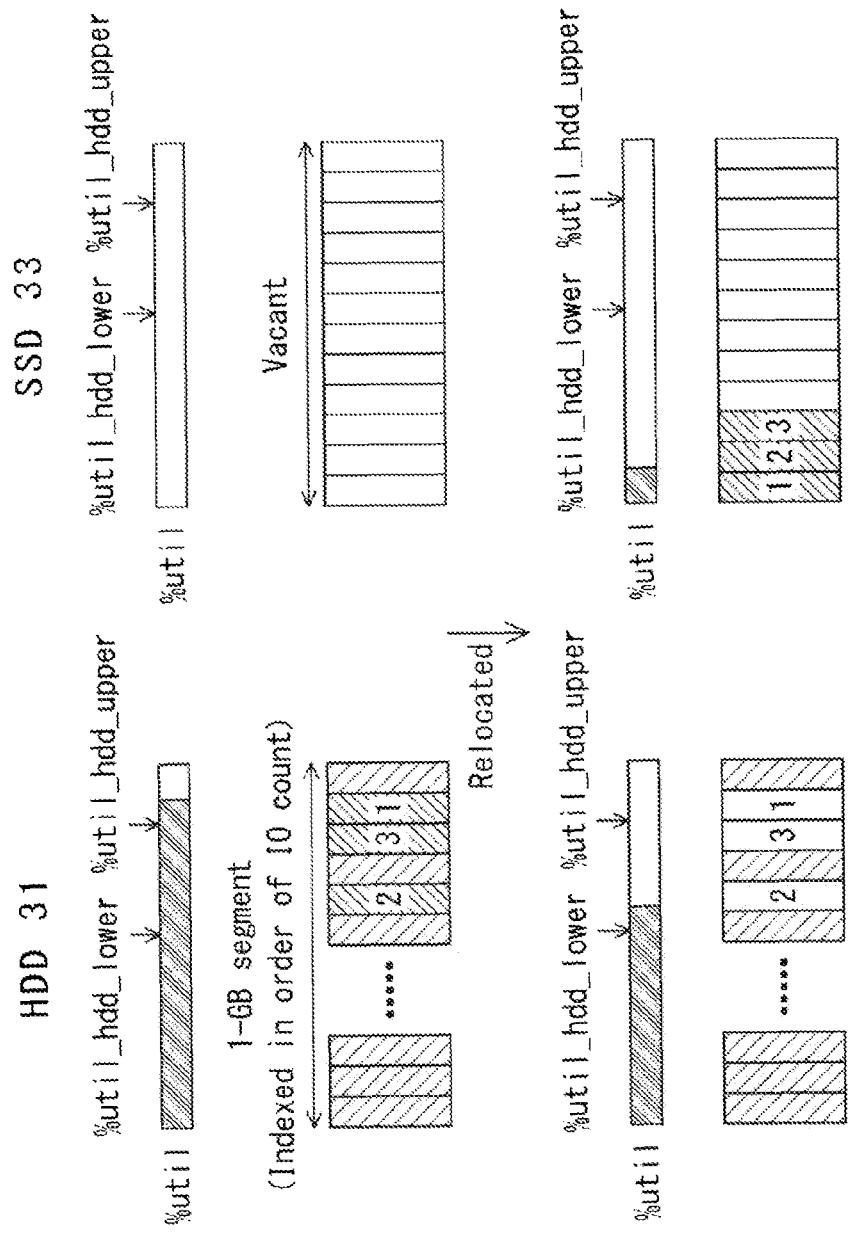
FIG. 5 is a schematic diagram illustrating how hot spots are relocated (mapped) between a HDD and an SSD in the storage system as an example of an embodiment.

FIG. 5 is a schematic diagram illustrating how hot spots are relocated between a HDD 31 and an SSD 33 in the storage system 1 as an example of an embodiment.

In an example of the present embodiment, the variation in the load in a short term (e.g., in four minutes) is analyzed, and some 1-GB segments in an HDD 31 experiencing higher IO load are relocated to an SSD 33 if the bandwidth of that HDD 31 is expected to be depleted (for example, the HDD 31 is expected to reach the upper-limit performance), thereby resolving the bandwidth depletion of the HDD 31.

As depicted in FIG. 5, predetermined thresholds, % util_HDD_lower and % util_HDD_upper, are set to the HDDs 31.

Here, the % util_HDD_upper is the upper-limit of the busy ratio (util %) of the HDDs 31. As depicted on the left side in FIG. 5, when the util % of a HDD 31 exceeds the % util_HDD_upper, the relocation commander 219 relocates one or more 1-GB segments in that HDD 31 to an SSD 33 until the util % of the HDD 31 becomes equal to or lower than the % util_HDD_lower.

The % util_HDD_upper and the % util_HDD_lower may be set to the information processing apparatus 11 in advance as factory settings, or may be set by a user. The % util_HDD_upper and the % util_HDD_lower may also be variable by the user later.

Specifically, the load analyzer 215 calculates the average of immediate previous p (e.g., p is 4) IO counts per second (inputs/outputs per second, iops) read from iostat logs 41 generated by the load statistics obtaining unit 213. Further, the load analyzer 215 determines the average of immediate previous p % util (busy ratios). The load analyzer 215 then determines the "% util (=busy ratio) per Iops" for the entire volume by dividing the average iops by the average % util.

If the average % util of an HDD 31 exceeds the % util_HDD_upper, the load analyzer 215 determines that the HDD 31 is overloaded. The load analyzer 21 then selects certain one or more 1-GB segments from HDD 31 and relocates them to an SSD 33 until the overload is resolved.

If the % util of the HDD 31 becomes equal to or lower than the % util_HDD_lower, the load analyzer 215 determines that the overload of the HDD 31 is resolved.

Next, selection of one or more 1-GB segments in a HDD 31 to be relocated to an SSD 33 will be described with reference to FIG. 5.

As set forth above, the load analyzer 215 calculates the averages of iops and % util for the entire volume, from immediate previous p iostat results in iostat logs 41 generated by the load statistics obtaining unit 213, and determines the "% util per Iops" from the two averages.

The load analyzer 215 then calculates the average of immediate previous p IO counts in a blktrace log 43 to determine the IO count per second (iops) of each 1-GB segment, and sorts (indexes) the 1-GB segments in the descending order of the iops.

Further, the load analyzer 215 calculates the number (q) of 1-GB segments to be relocated, so as to reduce the % util of the HDD 31 to the % util_HDD_lower or smaller, in the order of the index, using the "% util per Iops" determined in the above process, in the following procedure (i) to (iv):
(i) Initializes variables: % util_temp=0, and q=0
(ii) % util_temp=% util_temp+(iops (q) per 1-GB segment)×(% util per iops)
(iii) Terminates if % util−% util_temp<the % util_HDD_lower stands true. As a result, q segments are selected.
(iv) Increments q=q+1 and returns to the above step (ii).

Note that, if there are no free 1-GB segments in the number determined in the above procedure (i) to (iv) in at least one SSD 33 subordinate to the information processing apparatus 11, a new SSD 33 is added. The number of SSDs 33 to be added is determined, from the number of lacking 1-GB segments in an SSD 33, and the total number of 1-GB segments in a single SSD 33.

Finally, the relocation commander 219 relocates 1-GB segments in the HDD 31 in the ascending order of the index until the % util (busy ratio) of the HDD 31 becomes equal to or lower than the % util_HDD_lower. If there are no sufficient free segments in at least one SSD 33 and an additional SSD 33 is to be added, the relocation commander 219 issues a configuration modification instruction to the management apparatus 13.

In response to the configuration modification instruction, the management apparatus 13 modifies the settings of the switch 17 to connect an unused SSD 33 (SSD 33 that is not connected to any of the information processing apparatuses 11) to the requesting information processing apparatus 11 for adding that SSD 33.

Next, a flow of storage monitor processing in the storage system 1 as an example of an embodiment will be described with reference to FIG. 6.

In Step S 1, the load analyzer 215 calculates the average of immediate previous p (e.g., p is 4) iops read from iostat logs 41 generated by the load statistics obtaining unit 213. Further, the load analyzer 215 determines the average of immediate previous p % util.

In Step S 2, the load analyzer 215 then determines the "% util (=busy ratio) per Iops" for the entire volume.

Next, in Step S 3, the load analyzer 215 reads IO traces (blktrace logs 43) generated by the load statistics obtaining unit 213, and calculates the average IO count for each 1-GB segment in at least one HDD 41 to determine the iops. The load analyzer 215 then sorts the 1-GB segments in the descending order of iops (refer to FIG. 5).

Next, in Step S 4, the load analyzer 215 determines whether or not the average % util determined in Step S 1 exceeds the % util_HDD_upper.

If the average % util exceeds the % util_HDD_upper (refer to the YES route from Step S 4), the load analyzer 215 determines that the bandwidth of the HDD 31 is about to be depleted and proceeds to Step S 5 to initiate a relocation of 1-GB segments to an SSD 33.

If the average % util does not exceed the % util_HDD_upper (refer to the NO route from Step S 4), the load analyzer 215 determines that the bandwidth of the HDD 31 is available and transitions to Step S 7 where the flow moves back to Step S 1 after waiting (sleeping) for T minutes (e.g., 1 minute).

In Step S 5, the relocation commander 219 determines the number of 1-GB segments to be relocated to an SSD 33. This number is determined from the "% util per Iops" determined in Step S 2 and the iops for each 1-GB segment determined in Step S 3, as the number of 1-GB segments until the average % util of the HDD 31 becomes equal to or lower than the % util_HDD_lower. More specifically, the relocation commander 219 calculates the number of 1-GB segments to be relocated so that the load of the HDD 31 becomes equal to or lower than the % util_HDD_lower, in the above procedure (i) to (iv) using the "% util per Iops" determined in Step S 2.

Next, in Step S 6, the relocation commander 219 looks for free 1-GB segments in an SSD 33 and reserves 1-GB segments in that SSD 33 in the number determined in Step S 5, if they are available. If sufficient free segments cannot be reserved in the SSD 33, the relocation commander 219 requests the management apparatus 13 to add a new SSD 33. The relocation commander 219 copies the contents in 1-GB segments in the HDDs 31 in the descending order of iops determined in Step S 2, to free segments reserved in the SSD 33. The relocation commander 219 removes the 1-GB segments the contents of which have been copied, from the HDD 31, as depicted in FIG. 5.

Then, the flow transitions to Step S 7, where the flow moves back to Step S 1 after waiting (sleeping) for T minutes (e.g., 1 minute).

Note that the wait (sleep) time in Step S 7 may be set as a factory setting and/or may be set arbitrary by a user, in accordance with the system requirement.

Although not specifically illustrated in the flow, when the load of the HDD 31 is reduced lower than a predetermined threshold, the contents of the 1-GB segments of which have been copied to the SSD 33, the contents of those 1-GB segments in the SSD 33 are copied back to the HDD 31. More specifically, the average % util of the SSD 33 is determined in the manner similar to FIGS. 5 and 6 and is then compared against a predetermined threshold. Then, the number of 1-GB blocks to be relocated to the HDD 31 is calculated, and data in the blocks in that number is copied to the HDD 31. If no data is remained in the SSD 33 after removing the data from the SSD 33, that SSD 33 is disconnected from the information processing apparatus 11.

FIG. 7 illustrates an example of an iostat log 41 before a relocation of a hot spot in the storage system 1 as an example of an embodiment hot spot. FIG. 8 illustrates an example of the operation log during the relocation of the hot spots. FIG. 9 illustrates an example of the iostat log 41 during the relocation of the hot spots.

Before relocation of hot spots, only the HDD 31 having the device name "sdc" is overloaded and the % util of that HDD 31 is 100.01. The iops of that HDD 31 is 247.60 iops.

As depicted in FIG. 8, hot spots are relocated. After the relocation of the hot spots, as depicted in FIG. 9, the % util of the HDD 31 is reduced to 68.75%, which is within an optimal range from 60% to 90%. The total iops of the HDD 31 and the SSD 33 after the relocation is 261.45 iops.

While the number of 1-GB segments to be relocated from the HDD 31 to an SSD 33 is calculated in the above procedure (i) to (iv) in the above-described embodiment, processing may be simplified using a simplified procedure in a modification to the embodiment.

For example, the load analyzer 215 may add an SSD 33 to preemptively increase the upper-limit performance of the storage configuration, if the difference between the upper-limit performance (e.g., upper-limit iops) of the current storage configuration and the current iops becomes lower than a predetermined threshold. Here, the upper-limit performance (e.g., upper-limit iops) of a storage configuration is the maximum performance theoretically achievable from the current storage configuration, and can be determined from the following formula, for example:

The upper-limit performance=(the number of HDDs 31)×(the performance of a single HDD 31)+(the number of SSDs 33)×(the performance of a single SSD 33)   Eq. (1)

The performances of HDDs 31 and SSDs 33 may be determined by measuring the performances of the HDDs 31 and SSDs 33 in advance to determine the respective iops achievable by single HDD 31 and SSD 33, for example.

As an example, the initial configuration of the storage system 1 includes a single HDD 31 (with a performance of 200 iops) and a single SSD 33 (with a performance of 3000 iops). The upper-limit performance (upper-limit iops) of the initial configuration of the storage configuration is determined as 3000×1+200×1=3200 iops using Eq. (1).

The threshold for the difference between the upper-limit iops and the current iops is 500 iops, for example.

Under these conditions, the iostat command is executed at one minute interval for collecting OS statistics information, and it is determined at one minute interval whether or not the difference between the upper-limit iops and the current iops becomes lower than this threshold.

The storage system 1 does not modify the configuration unless the iops value obtained from the iostat command exceeds 2700 iops, i.e., 3200 iops (upper-limit performance)−500 iops (threshold). In contrast, if the iops value obtained from the iostat command exceeds 2700 iops, the storage system 1 adds one SSD 33 and relocates loaded portions to the newly added SSD 33.

Since iops per SSD is 3000 iops in this example, the difference between the upper-limit iops and the current iops would exceed 500 iops if the relocation commander 219 adds one SSD 33, for example.

After modifying the configuration, the upper-limit iops improves from 3200 to 6200.

In the above example, hot spots are relocated from a HDD 31 to an SSD 33 after they are detected. Additionally or alternatively, in the storage system 1 as an example of an embodiment, the load predictor 217 in the workload analyzing and configuring unit 211 predicts the load, and hot spots are relocated based on expected and load estimate.

Figure 10:
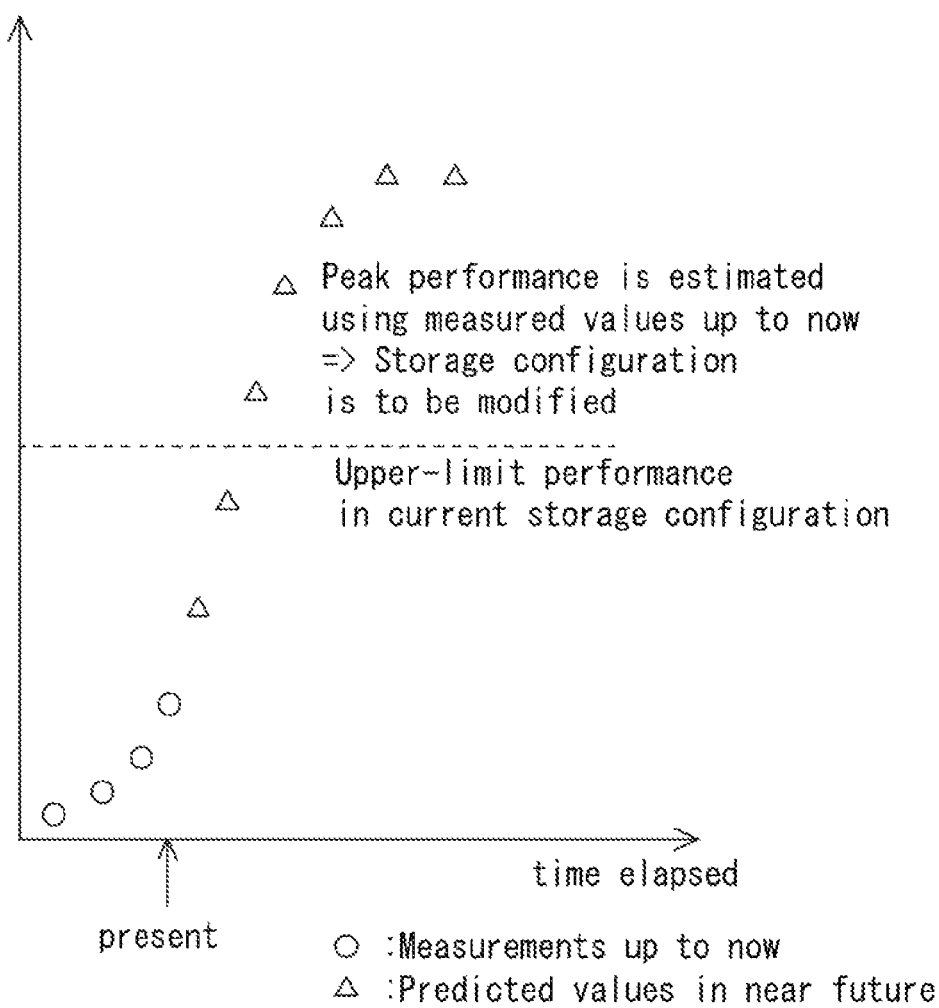
FIG. 10 is a schematic diagram illustrating how loads are predicted in the storage system as an example of an embodiment.

FIG. 10 is a schematic diagram illustrating how loads are predicted by the load predictor 217 as an example of an embodiment.

As depicted in FIG. 10, the load predictor 217 extracts iops from statistics information up to now collected by the load statistics obtaining unit 213, and predicts a peak iops in a near future. If the expected (estimated) peak iops exceeds the upper-limit iops of the current storage configuration (at least one HDD 31 and SSD 33) of the information processing apparatus 11, the load predictor 217 adds an SSD 33 so as to increase the upper-limit iops for an expected upsurge of the load (spike).

For example, the load predictor 217 determines the peak iops based on a statistic of p (e.g., p is 4 or 8) measurements up to now (e.g., the circles indicated in the graph in FIG. 10), e.g., the simple moving average (SMA) of the p measurements.

As an example, when the % util of the HDD 31 is low, the load predictor 217 determines the increase rate of the load per 1-GB segment as a simple moving average, and estimates a future load from that simple moving average. If it is expected that the estimate indicates an overload (i.e., % util exceeds 100), relocation from the HDD 31 to an SSD 33 under the higher-load condition can be avoided by relocating expected overloaded portions to the SSD 33.

As set forth above, the load statistics obtaining unit 213 obtains OS statistics information (iostat logs 41) and IO traces (blktrace logs 43) at regular intervals and accumulate them. For example, such data is obtained and accumulated at one minute interval and immediate previous eight measurements are required, data in immediate previous eight minutes is extracted from the iostat logs 41 and the blktrace logs 43. The increase rate of iops is determined from the SMA of the eight measurements to estimate a future load.

Next, a flow of storage monitor processing involving a prediction of a load surge in the storage system 1 as an example of an embodiment will be described with reference to FIG. 11.

In Step S 11, the load analyzer 215 reads IO traces (blktrace logs 43) generated by the load statistics obtaining unit 213, and calculates the average IO amount (e.g., IO count) and the simple moving average (SMA) of the IO amounts for each 1-GB segment in at least one HDD 41.

For example, the load analyzer 215 calculates the SMA using the following Eq. (2):

$$SMA=((data[1]-data[0])/1+(data[2]-data[0]/2)+ \ldots +(data[i]-data[0])/i))/(I-1)$$

$$\{i=1,2,3,\ldots, I-1\} \quad \text{Eq. (2)}$$

The resultant SMA of IO amounts is used in the subsequent steps as an estimate of the increase rate of the IO amount at present.

In Eq. (2), data[0] represents the oldest value of the values read from the IO trace (blktrace logs 43) for calculating the SMA, data[1] represents the second oldest value, . . . , and data[I−1] represents the newest value.

Next, in Step S 12, the load analyzer 215 calculates the average of immediate previous p (e.g., p is 8 in this example) iops read from iostat logs 41 generated by the load statistics obtaining unit 213. Further, the load analyzer 215 determines the average of immediate previous p % util.

In Step S 13, the load analyzer 215 then determines the "% util (=busy ratio) per Iops" for the entire volume.

Next, in Step S 14, the load predictor 217 determines an estimated IO amount j minutes later, using the average IO amount and the SMA per 1-GB segment determined in Step S 11. For example, the load predictor 217 calculates the estimated IO amount j minutes later (j minutes from now) using the following Eq. (3):

The estimated IO amount j minutes later=the current average IO amount+j×SMA    Eq. (3)

Further, the load predictor 217 determines the "estimated iops j minutes later" by dividing the "estimated IO amount j minutes later" determined in Eq. (3) by the length of time duration during which the IO traces are obtained.

The load predictor 217 determines the above value for all 1-GB segments. Next, after determining the estimated iops per 1-GB segment, the load predictor 217 then sorts (indexes) the 1-GB segments in the descending order of the estimated iops (refer to FIG. 5).

Next, in Step S 15, the load predictor 217 obtains the "total estimated iops j minutes later" by summing the estimated iops of each 1-GB segment.

Next, in Step S 16, the load predictor 217 determines an "estimated % util j minutes later" using the "% util per iops" determined in Step S 13 and the "total estimated iops j minutes later" determined in Step S 15.

Here, the load predictor 217 assumes that the current load is maintained and calculates the estimated % util j minutes later using the following Eq. (4):

The estimated % util j minutes later="% util per iops"×"total estimated iops j minutes later"    Eq. (4)

Thereby the load of the HDD 31 is predicted.

Next, in Step S 17, the load predictor 217 determines whether or not the estimated % util j minutes later determined in Step S 16 exceeds the % util_HDD_upper described above.

If the estimated % util j minutes later exceeds the % util_HDD_upper (refer to the YES route from Step S 17), the flow transitions to Step S 18 where the segments where the load is expected to be increased (occurrence of a hot spot is expected) is relocated to an SSD 33.

If the expected % util j minutes later does not exceed the % util_HDD_upper (refer to the NO route from Step S 17), the load predictor 217 determines that the bandwidth of the HDD 31 would also be available j minutes and transitions to Step S 20 where the flow moves back to Step S 11 after waiting (sleeping) for T minutes (e.g., 1 minute).

In Step S 18, the relocation commander 219 determines the number of 1-GB segments to be relocated to an SSD 33. This number is determined from the "% util per Iops" determined in Step S 13 and the iops for each 1-GB segment determined in Step S 14, as the number of 1-GB segments until the expected % util of the HDD 31 becomes equal to or lower than the % util_HDD_lower. More specifically, the relocation commander 219 calculates the number of 1-GB segments to be relocated so that the expected load of the HDD 31 becomes equal to or lower than the % util_HDD_lower, in the above procedure (i) to (iv) using the "% util per Iops" determined in Step S 13.

Note that, if there are no free 1-GB segments in the number determined in the above procedure (i) to (iv) in at least one SSD 33 subordinate to the information processing apparatus 11, a new SSD 33 is added. The number of SSDs 33 to be added is determined, from the number of lacking 1-GB segments in an SSD 33, and the total number of 1-GB segments in a single SSD 33.

Next, in Step S 19, the relocation commander 219 looks for free 1-GB segments in an SSD 33 and reserves 1-GB segments in that SSD 33 in the number determined in Step S 18, if they are found. If there are no sufficient free segments in at least one SSD 33 and an additional SSD 33 is to be added, the relocation commander 219 issues a request to add an SSD 33 to the management apparatus 13. The relocation commander 219 copies the contents in 1-GB segments in the HDDs 31 in the descending order of iops determined in Step S 2, to free segments reserved in the SSD 33. The relocation commander 219 removes the 1-GB segments the contents of which have been copied, from the HDD 31, as depicted in FIG. 5.

Then, the flow transitions to Step S 20, where the flow moves back to Step S 11 after waiting (sleeping) for T minutes (e.g., 1 minute).

Note that the wait (sleep) time in Step S 20 may be set as a factory setting and/or may be set arbitrary by a user, in accordance with the system requirement.

Although not specifically illustrated in the flow, when the expected load of the HDD 31 is reduced lower than a predetermined threshold, the contents of the 1-GB segments of which have been copied to the SSD 33, the contents of those 1-GB segments in the SSD 33 are copied back to the HDD 31. More specifically, the expected % util of the SSD 33 is determined in the manner similar to FIGS. 5 and 11 and is then compared against a predetermined threshold. Then, the number of 1-GB blocks to be relocated to the HDD 31 is calculated, and data in the blocks in that number is copied to the HDD 31. If no data is remained in the SSD 33 after removing the data from the SSD 33, that SSD 33 is disconnected from the information processing apparatus 11.

FIG. 12 illustrates an operation log of a relocation of hot spots based on load prediction in the storage system 1 as an example of an embodiment hot spot.

In the example in FIG. 12, a prediction is made using immediate previous four measurements. Specifically, in this simulation, the initial load is set to be 60 iops, and the load is increased by 10 iops in every minute. In this scenario, the load after one hour reaches 60+10×60=660 iops.

Figure 11:
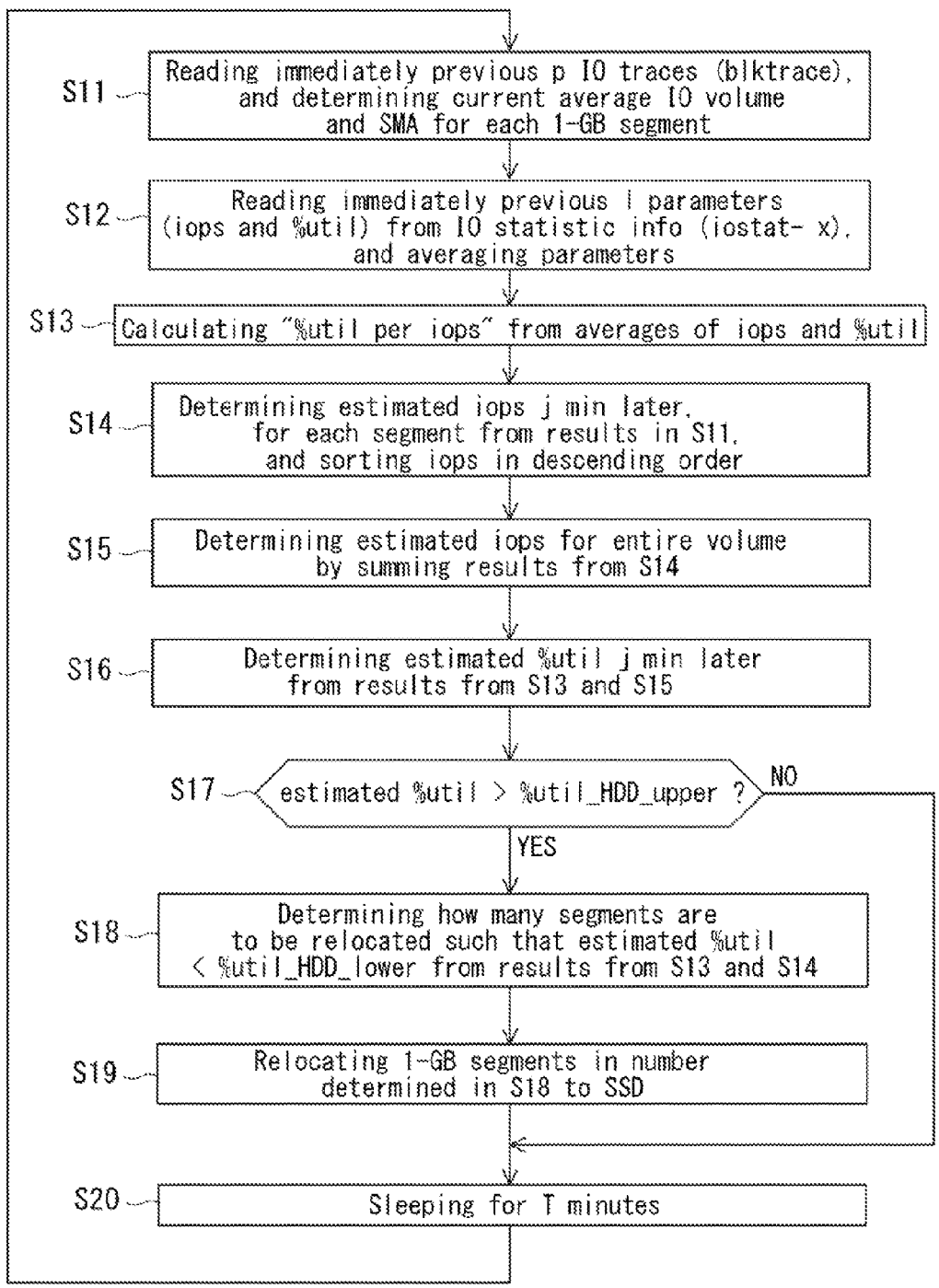
FIG. 11 is a flowchart illustrating a flow of storage monitor processing together with prediction of a rise in the load in the storage system as an example of an embodiment.

Under these conditions, the % util after one hour is predicted in the steps depicted in FIG. 11 from the four measurements.

In FIG. 12, the underlined portion denoted by (a) indicates expected current % util and iops estimated from immediate previous four measurements.

The underlined portion denoted by (b) indicates the SMA calculated from the immediate previous four measurements.

The underlined portion denoted by (c) indicates the load one hour later, i.e., the estimation obtained in the present embodiment.

The estimated iops one hour after the spike is 634 iops.

The underlined portion denoted by (d) indicates estimated % util after one hour, and % util=213.5 is impossible value exceeding 100, indicating an overload. In other words, in FIG. 12, an overload (% util=213.5) is determined.

As depicted in the underline (b) in FIG. 12, the SMA is about 9.5 iops, which is close to the simulated load increase of IO iops/minute, indicating an accurate prediction.

Further, an estimate of iops one hour after the spike is 634, which is close to iops after one after in the simulation, indicating that the prediction is also accurate.

Upon making predictions, in the similar manner to the modification to the embodiment described above, the processing can be simplified by using a simplified technique, instead of calculating the number of 1-GB segments to be relocated from a HDD 31 to an SSD 33.

For example, the load analyzer 215 may add an SSD 33 to preemptively increase the upper-limit performance of the storage configuration, if the difference between the predicted upper-limit iops of the current storage configuration and the predicted iops becomes lower than a predetermined threshold.

In this case, the iostat command is executed at one minute interval for collecting OS statistics information, and the predicted iops is estimated using any of known estimation techniques, such as the SMA.

It should be noted that the CPU 21 in the information processing apparatus 11 functions as the workload analyzing and configuring unit 211, the load statistics obtaining unit 213, the load analyzer 215, the load predictor 217, and the relocation commander 219 in FIG. 3, by executing a storage management program in the above-described embodiment.

The storage management program of the present disclosure makes a computer to: obtain load information for each of a plurality of portions defined by dividing the first storage unit; identify a candidate portion that is to be relocated in the first storage unit based on the load information; determine whether or not data in the candidate portion is allowed to be migrated to the second storage unit; add the second storage unit, when it is determined that the data in the candidate portion is not allowed to be migrated; and relocate the data in the candidate portion from the first storage unit to the added second storage unit.

Note that the program (storage management program) for implementing the functions as the workload analyzing and configuring unit 211, the load statistics obtaining unit 213, the load analyzer 215, the load predictor 217, and the relocation commander 219 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon embodying the functions as the workload analyzing and configuring unit 211, the load statistics obtaining unit 213, the load analyzer 215, the load predictor 217, and the relocation commander 219, programs stored in internal storage apparatuses (the memory 23 in the information processing apparatus 11) are executed by a microprocessor of the computer (the CPU 21 in the information processing apparatus 11 in this embodiment). In this case, the computer may alternatively read a program stored in the storage medium for executing it.

Further, the functions as the management apparatus 13 in FIGS. 1 and 2 are implemented by a CPU (not illustrated) in the management apparatus 13 by executing the storage management program.

Upon embodying the functions as the management apparatus 13, the program stored in an internal storage device (the information processing apparatus in the management apparatus 13 in this embodiment) is executed by a microprocessor of the computer (CPU (not illustrated) in the management apparatus 13 in this embodiment). In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the information processing apparatus 11 and the management apparatus 13 include a function as a computer.

In accordance with the disclosed technique, the storage system 1, a method of managing a storage, and a storage management program which can autonomously modify the configuration of a storage apparatus in accordance with the load from users.

Hence, repeated capacity planning and manual configuration modifications are eliminated, and the operation of the storage apparatus can be continued in the storage configuration decided in the capacity planning before deployment.

Further, no spare disk capacity or performance by providing spare disks and/or overdesigned performance disks is used, which can reduce the cost of the storage system 1.

Further, the storage system 1 can increase or decrease the upper-limit performance in response to an upsurge of the load (spike).

(C) Miscellaneous

Note that the present disclosure is not restricted to the embodiment described above, and various modifications may be made without departing from the spirit of the present invention.

For example, although all of the HDDs 31 have the same structure and capacity in an example of an embodiment described above, the HDDs 31 may have different structures and capacities (hetero-configuration).

Further, although all of the SSDs 33 have the same structure and capacity in an example of an embodiment described above, the SSDs 33 may have different structures and capacities (hetero-configuration).

Further, although all of the information processing apparatuses 11 are similarly configured in an example of an embodiment described above, the information processing apparatuses 11 may have different configurations.

Further, although volumes are divided into 1-GB segments in an example of an embodiment described above, the unit of dividing the volumes may be suitably modified.

Further, although the first storage unit is a HDD 31 and the second storage unit faster than the first storage unit is an SSD 33, the first storage unit and/or the second storage unit may be in one of any other types, as long as the second storage unit is faster than the first storage unit.

Further, although the switch 171 is an SAS switch in an example of an embodiment described above, the switch 171 may be any of switches other than an SAS switch.

Further, although the OS 27 running on the information processing apparatuses 11 is Linux in an example of an embodiment described above, other UNIX® operating systems or other OSs in different architecture may also be used. If a different OS is used, corresponding commands of that OS are used. For example, if the OS 27 is Windows® operating system, information corresponding to iostat logs 41 and blktrace logs 43 may be corrected using corresponding Windows commands.

It is noted that the configurations and operations of the storage system 1 which have been described may be omitted or may be combined as appropriate if necessary. In other words, the components and functions described above may be appropriately selected or combined together such that the functions of the disclosed technique are achieved.

Further, in an example of an embodiment described above, the order of the steps in the flows may be modified.

Figure 6:
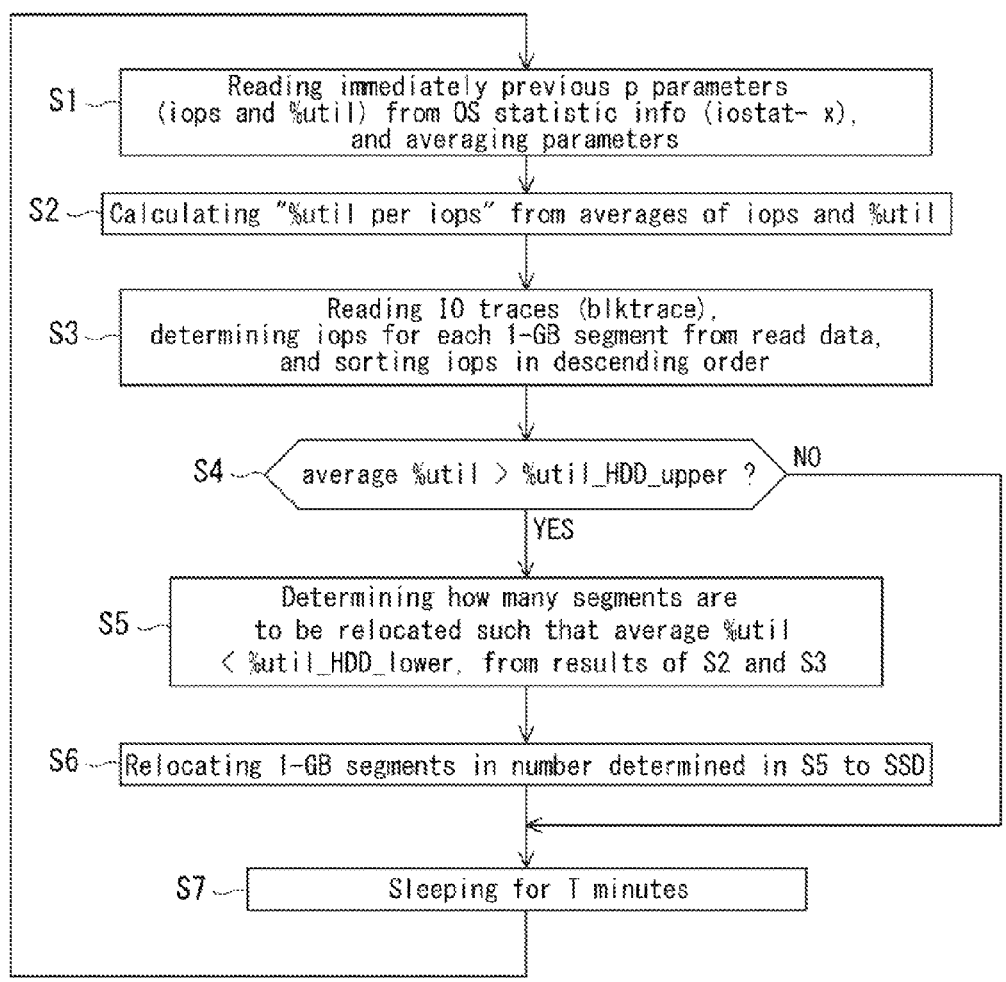
FIG. 6 is a flowchart illustrating a flow of storage monitor processing in the storage system as an example of an embodiment.

For example, in the flowchart in FIG. 6, Step S 3 may be executed before executing Steps S 1 and S 2.

For example, in the flowchart in FIG. 11, Steps S 12 and S 13 may be executed before executing Step S 11.

Further, although simple moving averages are used for load predictions in an example of an embodiment described above, loads may be predicted using any of the other methods. For example, the load predictor 217 may estimate the upper-limit performance by determining an approximation curve most fitted to the measurements up to now (circles in FIG. 10).

Further, the steps in flowcharts described above may be combined.

For example, a relocation of segments in a HDD 31 based on the average % util in FIG. 6 may be combined with a relocation of segments in a HDD 31 based on the estimated % util in FIG. 11.

In accordance with the present disclosure, the configuration of a storage apparatus can be modified in accordance with the load.

INDUSTRIAL APPLICABILITY

The present technique can be applicable to RAID apparatuses, tiered storages, cluster storages, pooled storages, massive storages for data centers, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage pool-type storage system comprising:
a plurality of storage units configuring a storage pool, the plurality of storage units including a plurality of first storage units and a plurality of second storage units having an access speed higher than an access speed of the first storage units;
an information processing apparatus;
a switch that is capable of dynamically switching connections among the storage units and the information processing apparatus;
a load information obtaining unit that obtains load information for each of a plurality of portions defined by dividing at least one first storage unit that is connected to the information processing apparatus;
a portion identifying unit that identifies a candidate portion in which data contained therein is to be relocated in the at least one first storage unit based on the load information;
a determining unit that determines whether or not any of the second storage units are connected to the information processing apparatus, and whether or not, in a case where at least one second storage unit is connected to the information processing apparatus, data in the candidate portion is allowed to be migrated to any of the second storage units connected to the information processing apparatus;
an adder that, in a case where the determining unit determines that no second storage unit is connected to the information processing apparatus, or in a case where the data in the candidate portion is not allowed to be migrated to any of the second storage connected to the information processing apparatus, instructs the switch to connect an unused second storage unit of the second storage units to the information processing apparatus; and
a relocation unit that writes the data in the candidate portion, from the first storage unit in which the candidate portion is present, to a destination second storage unit that is determined that the candidate portion is allowed to be migrated by the determining unit or that is connected by the adder, and then deletes the data in the candidate portion from the first storage unit;
wherein the determining unit determines whether or not the load information of data in the candidate portion that has been migrated to the destination second storage unit is smaller than a second threshold;
in a case where the determining unit determines that the load information of the data in the candidate portion that has been migrated to the destination second storage unit is smaller than the second threshold, the relocation unit writes the data in the candidate portion that has been migrated to the destination second storage, back to any of the first storage units connected to the information processing apparatus, and then deletes the data in the candidate portion from the destination second storage unit; and
in a case where no data is present in the destination second storage unit, the adder instructs the switch to disconnect the destination second storage unit.

2. The storage pool-type storage system according to claim 1, wherein the portion identifying unit identifies at least one portion in a descending order of a value related to the load information, until the value related to the load information becomes lower than a predetermined threshold.

3. The storage pool-type storage system according to claim 1, wherein the determining unit determines that the data in the candidate portion is not allowed to be migrated in a case where the destination second storage unit does not have any free space where the data in the candidate portion is to be migrated.

4. The storage pool-type storage system according to claim 1, wherein the portion identifying unit identifies the candidate portion based on busy rates of the first storage units and a number of input/output requests per unit time.

5. The storage pool-type storage system according to claim 1, wherein the portion identifying unit predicts the load information based on the busy rates of the first storage units and a simple moving average of a number of input/output requests, and identifies the candidate portion based on the predicted load information.

6. A method of managing a storage pool-type storage system comprising a plurality of storage units configuring a storage pool, the plurality of storage units including a plurality of first storage units and a plurality of second storage units having an access speed higher than an access speed of the first storage units; an information processing apparatus; and a switch that is capable of dynamically switching connections among the storage units and the information processing apparatus, the method comprising:
obtaining load information for each of a plurality of portions defined by dividing at least one first storage unit that is connected to the information processing apparatus;
identifying a candidate portion in which data contained therein is to be relocated in the at least one first storage unit based on the load information;
determining whether or not any of the second storage units are connected to the information processing apparatus, and whether or not, in a case where at least one second storage unit is connected to the information processing apparatus, data in the candidate portion is allowed to be migrated to any of the second storage units connected to the information processing apparatus;

in a case where it is determined that no second storage unit is connected to the information processing apparatus, or in a case where the data in the candidate portion is not allowed to be migrated to any of the second storage units connected to the information processing apparatus, instructing the switch to connect an unused second storage unit of the second storage units to the information processing apparatus;

writing the data in the candidate portion, from the first storage unit in which the candidate portion is present, to a destination second storage unit that is determined that the candidate portion is allowed to be migrated or that is connected, and then deleting the data in the candidate portion from the first storage unit;

determining whether or not the load information of data in the candidate portion that has been migrated to the destination second storage unit is smaller than a second threshold;

in a case where it is determined that the load information of the data in the candidate portion that has been migrated to the destination second storage unit is smaller than the second threshold, writing the data in the candidate portion that has been migrated to the destination second storage, back to any of the first storage units connected to the information processing apparatus, and then deleting the data in the candidate portion from the destination second storage unit; and in a case where no data is present in the destination second storage unit, instructing the switch to disconnect the destination second storage unit.

7. The method according to claim 6, wherein the identifying comprises identifying at least one portion in a descending order of a value related to the load information, until the value related to the load information becomes lower than a predetermined threshold.

8. The method according to claim 6, wherein the determining comprises determining that the data in the candidate portion is not allowed to be migrated in a case where the destination second storage unit does not have any free space where the data in the candidate portion is to be migrated.

9. The method according to claim 6, wherein the identifying comprises identifying the candidate portion based on busy rates of the first storage units and a number of input/output requests per unit time.

10. The method according to claim 6, wherein the identifying comprises predicting the load information based on the busy rates of the first storage units and a simple moving average of a number of input/output requests, and identifies the candidate portion based on the predicted load information.

11. A non-transitory computer-readable storage medium having a storage management program stored thereon, for managing a storage pool-type storage system comprising a plurality of storage units configuring a storage pool, the plurality of storage units including a plurality of first storage units and a plurality of second storage units having an access speed higher than an access speed of the first storage units;

an information processing apparatus;

and a switch that is capable of dynamically switching connections among the storage units and the information processing apparatus, when executed by a computer, the storage management program makes the computer:

obtain load information for each of a plurality of portions defined by dividing at least one first storage unit that is connected to the information processing apparatus;

identify a candidate portion in which data contained therein is to be relocated in the at least one first storage unit based on the load information;

determine whether or not any of the second storage units are connected to the information processing apparatus, and whether or not, in a case where at least one second storage unit is connected to the information processing apparatus, data in the candidate portion is allowed to be migrated to any of the second storage units connected to the information processing apparatus;

in a case where it is determined that no second storage unit is connected to the information processing apparatus, or in a case where the data in the candidate portion is not allowed to be migrated to any of the second storage units connected to the information processing apparatus, instruct the switch to connect an unused second storage unit of the second storage units to the information processing apparatus;

write the data in the candidate portion, from the first storage unit in which the candidate portion is present, to a destination second storage unit that is determined that the candidate portion is allowed to be migrated or that is connected, and then delete the data in the candidate portion from the first storage unit;

determine whether or not the load information of data in the candidate portion that has been migrated to the destination second storage unit is smaller than a second threshold;

in a case where it is determined that the load information of the data in the candidate portion that has been migrated to the destination second storage unit is smaller than the second threshold, write the data in the candidate portion that has been migrated to the destination second storage, back to any of the first storage units connected to the information processing apparatus, and then delete the data in the candidate portion from the destination second storage unit; and in a case where no data is present in the destination second storage unit, instructing the switch to disconnect the destination second storage unit.

12. The non-transitory computer-readable storage medium according to claim 11, wherein the storage management program makes the computer identify at least one portion in a descending order of a value related to the load information, until the value related to the load information becomes lower than a predetermined threshold.

13. The non-transitory computer-readable storage medium according to claim 11, wherein the storage management program makes the computer determine that the data in the candidate portion is not allowed to be migrated in a case where the destination second storage unit does not have any free space where the data in the candidate portion is to be migrated.

14. The non-transitory computer-readable storage medium according to claim 11, wherein the storage management program makes the computer identify the candidate portion based on busy rates of the first storage units and a number of input/output requests per unit time.

15. The non-transitory computer-readable storage medium according to claim 11, wherein the storage management program makes the computer predict the load information based on the busy rates of the first storage units and a simple moving average of a number of input/output requests, and identifies the candidate portion based on the predicted load information.

* * * * *